UNITED STATES PATENT OFFICE.

MAX WEILER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

RED TO VIOLET WOOL DYE.

947,876.  Specification of Letters Patent.  Patented Feb. 1, 1910.

No Drawing.  Application filed September 8, 1909. Serial No. 516,726.

*To all whom it may concern:*

Be it known that I, MAX WEILER, doctor of philosophy, chemist, a citizen of the German Empire, residing at Elberfeld, Germany, have invented new and useful Improvements in New Dye, of which the following is a specification.

My invention relates to the manufacture and production of new dyestuffs which are obtained by condensing oxynaphthaldehyde compounds, especially sulfonic- carboxylic- and sulfo-carboxylic acids, polyoxynaphthaldehydes with salicylic acid and ortho-cresotinic acid and oxydizing the leuco compounds thus obtained. The new dyestuffs can be treated on the fiber with bichromate of potassium, solid shades being thus obtained.

In order to illustrate the new process more fully the following example is given, the parts being by weight:

A mixture of 37.6 parts of 2-oxy-1-naphthaldehyde-3.7-disulfonic acid (sodium salt), 39 parts of ortho-cresotinic acid and 418 parts of a 88 per cent. sulfuric acid is heated to 40–45° C. while stirring until the whole cresotinic acid has entered into reaction. The mass of the reaction is poured into ice water and the leuco-compound is filtered off. Small quantities of ortho-cresotinic acid can be removed by means of organic solvents.

To produce the coloring matter from this leuco compound the dried product is dissolved in 5 times its quantity of concentrated sulfuric acid and this solution is stirred at 40–60° C. with the necessary quantity of $Na NO_2$. When the oxidation is finished, the melt is poured on ice and the dye is filtered off. It dyes wool red after-treated with chrome red-violet.

The new dyes are dark powders soluble in dilute caustic soda lye generally with a red color, dyeing wool from acid baths generally from red to violet shades, which can be chromed on the fiber.

Instead of ortho-cresotinic acid, salicylic acid, may be used, instead of 2-oxy-1-naphthaldehyde-3.7-disulfonic acid *e. g.* 2-oxy-1-naphthaldehyde-3.6-, 5.7-, 4.8-disulfonic acid or 7-sulfonic acid, 2 oxy-1-naphthaldehyde-3-carboxylic acid, 4-oxy-1-naphthaldehyde-3-sulfonic acid, 1-oxy-2-naphthaldehyde-3-, 4- or 5-sulfonic acid, 1-oxy-2-naphthaldehyde-3.8- or 4.8-disulfonic acid, 2-oxy-1-naphthaldehyde-3-carboxylic-6-sulfonic acid, 2-oxy-1-naphthaldehyde-3-carboxylic-8-sulfonic acid, 2.7-dioxy-1-naphthaldehyde, etc. The condensation can also be carried out in another manner *e. g.* with a mixture of acetic acid and sulfuric acid, a methyl-alcoholic sulfuric acid, etc.

The oxidation can be carried out with nitric acid, nitro compounds, etc.

I claim:—

The herein described dyestuffs obtainable from the herein defined naphthaldehyde derivatives and salicylic or ortho-cresotinic acid, which dyestuffs are dark powders soluble in dilute caustic soda lye generally with a red color, dyeing wool from acid baths generally from red to violet shades which can be chromed after dyeing, substantially as described.

In testimony whereof I have hereunto set my hand in the presence of two subscribing witnesses.

MAX WEILER. [L. S.]

Witnesses:
  OTTO KÖNIG,
  WILLY KLEIN.